United States Patent
Freimann

(10) Patent No.: US 7,154,612 B2
(45) Date of Patent: Dec. 26, 2006

(54) METHOD FOR CALIBRATING A RADIUS TEST BENCH

(75) Inventor: Rolf Freimann, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 238 days.

(21) Appl. No.: 10/420,573

(22) Filed: Apr. 22, 2003

(65) Prior Publication Data

US 2003/0223081 A1 Dec. 4, 2003

(30) Foreign Application Priority Data

May 31, 2002 (DE) .................................... 102 24 317

(51) Int. Cl.
*G01B 9/02* (2006.01)

(52) U.S. Cl. .................. 356/515; 356/513; 356/521
(58) Field of Classification Search ............ 356/521, 356/520, 512, 515, 513
See application file for complete search history.

(56) References Cited

U.S. PATENT DOCUMENTS 5,059,022 A  10/1991  Ookawa
5,416,574 A  *  5/1995  Fantone .................. 356/124
6,940,607 B1 *  9/2005  Freimann et al. ........ 356/521

FOREIGN PATENT DOCUMENTS

DE    100 05 171 A1    8/2001

OTHER PUBLICATIONS

Selberg, Lars A.; "Radius Measurement by Interferometry," Optical Engineering, vol. 31 (9), Sep., 1992, pp. 1961–1966.
An article entitled "Radius measurement by interferomety-"(Author Lars A. Selberg, Zygo Corporation, Laurel Brook Road, Middlefield, Connecticut 06455), Optical Engineering, Dated Sep. 1992, vol. 31, No. 9.
An article entitled "Wiley Series in Pure and Applied Optics," (copyright (c) 1992 by John Wiley & Sons, Inc.).

* cited by examiner

*Primary Examiner*—Andrew H. Lee
(74) *Attorney, Agent, or Firm*—Welsh & Katz, Ltd.

(57) ABSTRACT

In a method for calibrating a radius test bench for measuring radii of optical elements, in particular of lenses and spherical mirrors, there are provided an illuminating system 1 that generates a spherical wave and a diffractive optical element 3 that retroreflects a spherical wave of a specific radius into itself. The diffractive optical element 3 is introduced into the radius test bench in at least two positions, a first position thereof being a cat's eye position 1 and another position being an autocollimation position, as a result of which it is possible to use the radius of curvature simulated by the diffractive optical element 3 to detect deviations of the radius test bench from this radius of curvature as errors of the radius test bench, and thus to take them into account in the measurements of optical elements to be tested.

13 Claims, 2 Drawing Sheets

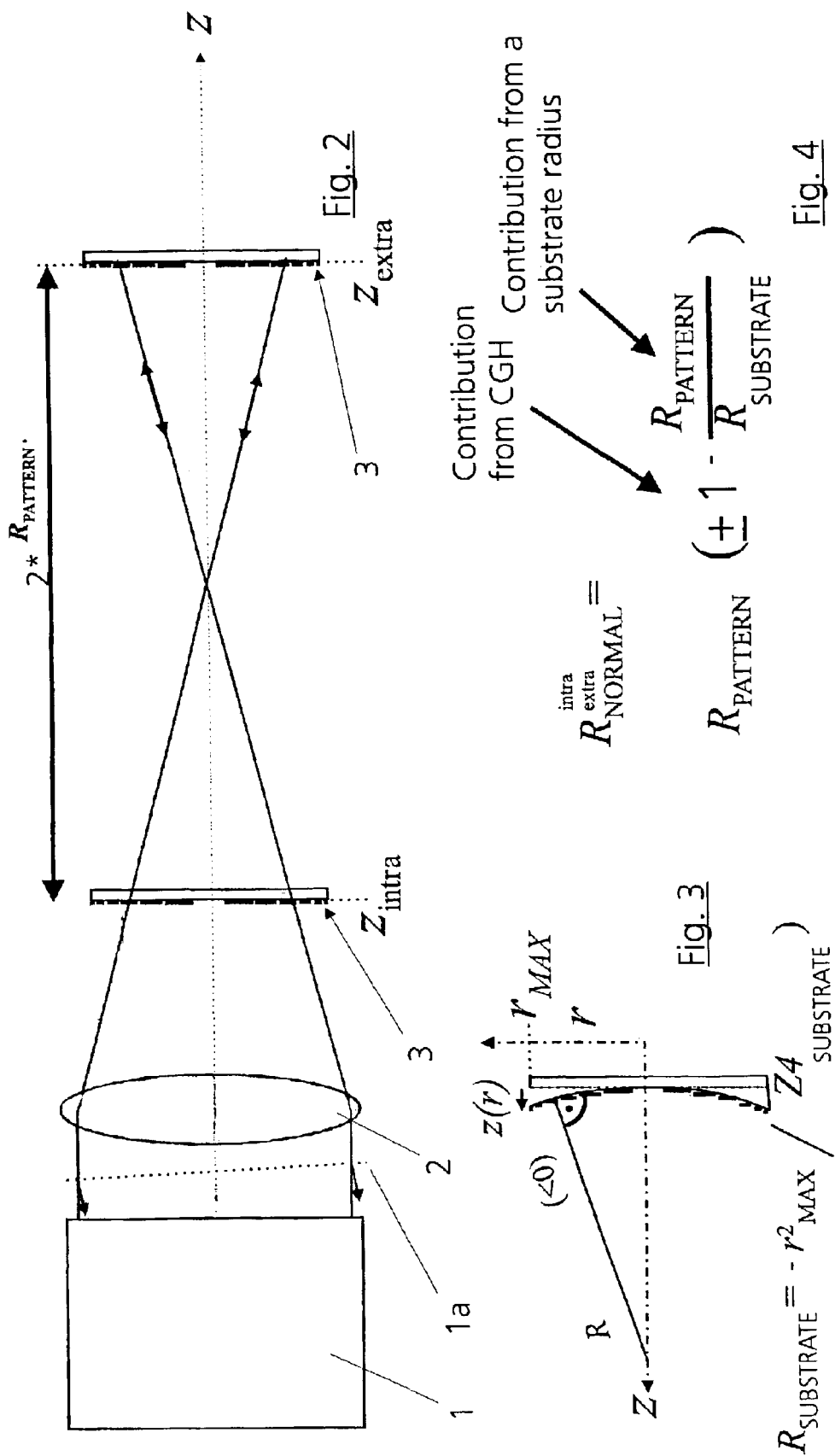

METHOD FOR CALIBRATING A RADIUS TEST BENCH

BACKGROUND OF THE INVENTION

1. Field of the Invention

The invention relates to a method for calibrating a radius test bench for measuring radii of optical elements, in particular of lenses and spherical mirrors.

2. Description of the Related Art

So-called radius test benches are known for testing the radii of curvature of spherical lenses and spherical mirrors. In this case, the sample is placed in reflection in a spherical wave emitted by an interferometer. In order to check the radius of curvature, the sample is positioned once in an autocollimation position and once in the cat's eye position. This procedure is described in detail in an article by Lars A. Selberg: "Radius measurement by interferometry" published in Optical Engineering 31(9) September 1992 pages 1961-1966 which is herewith incorporated by reference. The cat's eye position is also described in the well-known textbook "Optical Shop Testing", $2^{nd}$ edition, edited by Daniel Malacara; 1992 John Wiley & Sons Inc. In this position a mirror, which may be of arbitrary shape, e.g. plane or spherical, is located in the focus of a convergent spherical wave, so that this wave runs back into itself. The rays impinge on the mirror not perpendicularly. This is a fundamental difference to the autocollimation position. In the latter the rays impinge everywhere perpendicularly on the mirror and are reflected into theirselves. In both positions an incident spherical wave runs back into itself and it is the use of both positions which enables the construction of a radius test bench of the related art. The spacing of the two positions is then the radius of curvature being sought. A precondition for measuring as exactly as possible is, however, a very accurate radius test bench or knowledge of unavoidable errors of the radius test bench, in order to be able to take these into account later when measuring the sample.

Such errors are discussed in the article cited above.

SUMMARY OF THE INVENTION

The object of the present invention is therefore to provide a method with the aid of which the measuring accuracy of a radius test bench can be established in order to be able to take account of possible errors later when testing radii of curvature of lenses and mirrors with curved surfaces.

According to the invention, this object is achieved with the aid of an illuminating system which is a part of the radius test bench that generates a spherical wave, and with the aid of a diffractive optical element that retroreflects the spherical wave of a specific radius into itself, the diffractive optical element being introduced into the radius test bench in at least two positions, a first position thereof being a cat's eye position and another position being an autocollimation position, as a result of which it is possible to use the radius of curvature simulated by the diffractive optical element to detect deviations of the radius test bench from this radius of curvature as errors of the radius test bench, and thus to take them into account in the measurements of optical elements to be tested.

According to the invention, in order to calibrate the radius test bench use is made of a diffractive optical element (DOE) as radius normal which has very small rotationally symmetrical errors. Since the diffractive optical element is designed according to the invention such that it retroreflects a spherical wave into itself, a spherical mirror with an accurately known radius is simulated in this way. In order to check the radius test bench, the radius normal created in this way is then adjusted in the radius test bench in the autocollimation position and into the cat's eye position of the spherical wave generated by the illuminating system. The displacement path measured in this case between the two positions corresponds to the result of radius measuring by comparison with the very precisely known radius of the radius normal. Measuring errors of the radius test bench are determined in this way.

The test measurement for calibrating the radius test bench can basically be performed with two types of methods. A first method consists in this case of displacing the radius normal from the autocollimation position by the displacement path corresponding to the desired radius, and of checking whether one is thereby in the cat's eye position of the radius test bench. In the case of the second method, the radius normal is moved from the autocorrelation position to the cat's eye position, and the displacement path is measured and compared with the desired radius of the radius normal. In both cases, the error of the measuring set-up is obtained from the deviation as determined and can subsequently be taken into account correspondingly when measuring samples.

In a very advantageous way, use is made of a laser as light source and an interferometer, errors of the radius test bench being determined in the interferometer in the comparison of the spherical wave emitted from the illuminating system with the retroreflected spherical wave.

It is possible in a very advantageous way to use as diffractive optical element a computer-generated hologram (CGH) that is plotted on an x-y plotter.

Advantageous developments and refinements of the invention emerge from the remaining subclaims and from the exemplary embodiment described in principle below with the aid of the drawing, in which:

BRIEF DESCRIPTION OF THE DRAWINGS

FIG. 2 shows a further illustration of a radius test bench for a CGH radius absolute normal, FIG. 3 shows determination of $R_{SUBSTRATE}$, and FIG. 4 shows determination of $R_{NORMAL}$.

DETAILED DESCRIPTION

Figure 1:
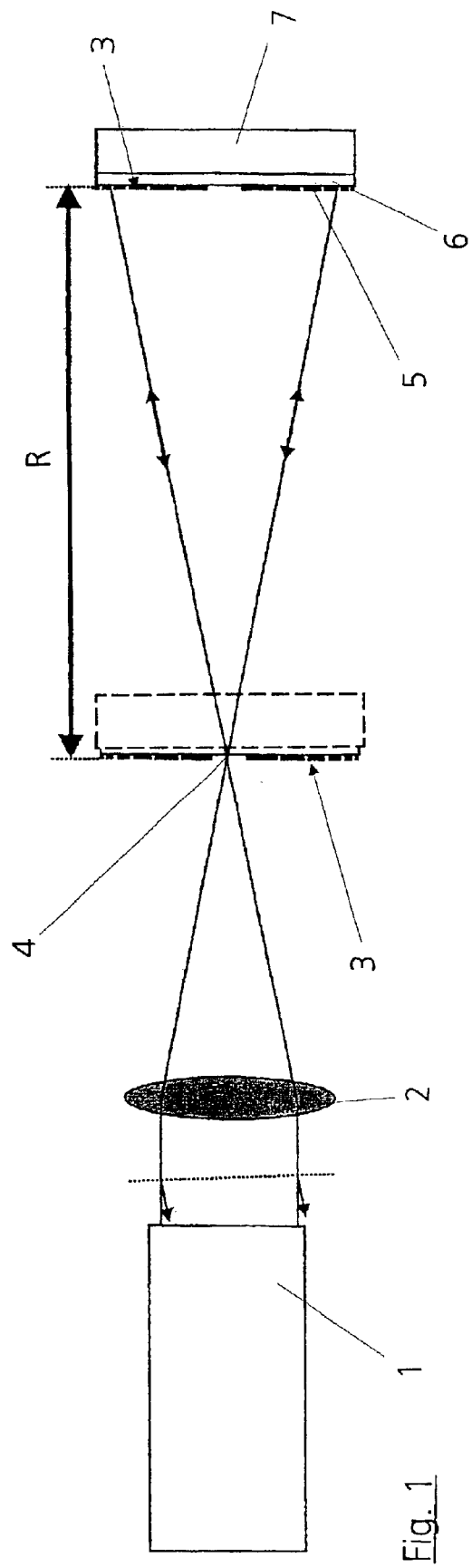
FIG. 1 shows a schematic of a radius test bench.

FIG. 1 shows a radius test bench that serves for measuring radii of optical elements such as lenses and spherical mirrors. The aim is to calibrate this test bench. Use is made for this purpose of a laser interferometer 1 as illuminating system that generates a spherical wave. A convergent beam is generated from a parallel beam by a transmission sphere 2 illustrated only in principle in the drawing. A reference surface 1a is also located in the beam path between the interferometer 1 and the transmission sphere 2 in order to establish a Fizeau interferometer. A computer-generated hologram (CGH) is now used as diffractive optical element (DOE) that retroreflects a spherical wave into itself for the purpose of calibrating the radius test bench. The computer-generated hologram is denoted below for short as "CGH radius normal". Such CGH radius normals with their circular line patterns can be produced very precisely, that is to say they "simulate" a spherical mirror with an exact radius of curvature. Conventional laser beam or e-beam writers position a plotting beam with relative scale errors of <1 ppm, as a result of which it is possible, for example, to produce the ring radii of an in-line CGH with this uncertainty on average. If now, in accordance with the invention, the CGH radius normal is designed such that it retroreflects a spherical wave into itself, it simulates a spherical mirror with an accurately known radius.

To be precise, a such designed CGH radius normal simulates two kinds of spherical mirrors a convex and a concave one. The radii of curvature are of the same modulus but they have different signs. The radius of the simulated convex mirror is counted positive whereas the radius of the concave mirror is negative. The occurance of two simulated spherical mirrors is closely linked to the existence of pairwise diffraction orders±m with alternating signs and leads to the existence of a pair of autocollimation positions.

If the CGH radius normal is positioned in front of the focus in a distance which corresponds to the modulus of the simulated mirror's radius then we call this first autocollimation position the intrafocal position. Likewise, if it is positioned in the same distance behind the focus we call this second autocollimation position the extrafocal position. In the former the CGH simulates a convex spherical mirror, in the latter a concave one.

In order to check the radius test bench, the CGH radius normal 3 is once brought into an autocollimation position and once into the cat's eye position 4 (dashed representation in the figure). There are in principle two ways for calibrating or for establishing the accuracy of the radius test bench, specifically:
1. The CGH radius normal is firstly brought into one of the two autocollimation positions. Subsequently, a displacement path R that corresponds to the known radius of the spherical wave simulated by the CGH radius normal is completed. After execution of the displacement path R, a check is made as to whether the cat's eye position 4 of the transmission sphere 2, specifically the focus, has been reached. Deviations from the cat's eye position 4, which is established by the interferometer, therefore exhibit the error of the radius test bench. This error can later be taken into account appropriately when measuring samples.
2. A displacement from an autocorrelation position exactly into the cat's eye position 4 is carried out, the displacement path R' being measured. The displacement path R' completed is compared with the desired displacement path R, which corresponds to the desired radius of the CGH radius normal 3. Deviations between the displacement paths R and R' exhibit the error of the radius test bench here, in turn.

By simultaneous use of the intrafocal and extrafocal autocorrelation positions, the measuring accuracy can be still further increased. This is set forth below in more detail.

An in-line type or else an off-axis type CGH can be used as CGH radius normal 3. The advantage of an off-axis type resides in the fact that possibly disturbing diffraction orders can be more effectively masked out. The method is able to check the measuring accuracy both for concave mirrors and for convex mirrors using a single CGH radius normal because of the existence of a pair of autocollimation positions.

It is also likewise possible to measure the displacement path between the abovementioned intra- and extrafocal autocollimation positions and to test thereafter whether the cat's eye position is really exactly in the middle. Systematic errors in approaching the cat's eye position 4 can be detected in this way.

Arbitrary pairs of diffraction orders can be used when measuring with the aid of the CGH radius normal 3. However, as a rule the plus and minus first diffraction orders are used. It is advantageous to leave the CGH substrate free in the middle, in order to maintain the cat's eye reflection undisturbed. As an alternative, however, it would also be possible to specifically apply coatings for the purpose of improving the measuring accuracy in the cat's eye position.

The measuring range of a radius test bench can be optimally covered when CGH radius normals are produced with various simulated radii.

The CGH radius normal 3 will advantageously be written on a quartz glass or Zerodur substrate in order to avoid thermal effects. When it is written onto a wafer 6 in the form of a chromium mask 5, said wafer should be applied to a fixed carrier 7, cemented thereon so as to achieve a greater degree of stability.

The CGH radius normal 3 is—as previously mentioned—generally written on an x-y plotter; however, if appropriate, a high accuracy rotation plotter also suffices. It is possible with the aid of a CGH radius normal 3 to calibrate a radius test bench exactly, or to determine a test bench error thereof with extreme accuracy. If use is made, for example, of a CGH radius normal with a diameter of 100 mm and a radius of the simulated spherical mirror of R=300 mm, the result is a relative scaling uncertainty of at most 1 ppm in conjunction with an uncertainty for R of ±0.6 µm. A wavelength uncertainty of at most 1 ppm yields an uncertainty for R of ±0.3 µm. A focusing uncertainty of $\lambda/100$ at the edge of the substrate of the CGH produces an uncertainty in R of ±0.4 µm. The root of the quadratic sum of the uncertainties for R is therefore ±0.8 µm This corresponds to a $\Delta R/R^2 = 0.9 \times 10^{-8}$ mm$^{-1}$.

It has so far been assumed that the CGH radius normal has been so accurately produced that it simulates a spherical mirror with an accurately known radius of curvature. The measurement method is extended below in FIG. 2, such that it is also possible to operate with the aid of less accurately produced CGH structures and yet to measure accurately. For this purpose, the radius of the simulated spherical mirror, called $R_{PATTERN}$ from now on, is measured in the radius test bench. ($R_{PATTERN}$ will deviate from the desired radius of the simulated spherical mirror given an inaccurately produced CGH radius normal.) In order to measure $R_{PATTERN}$, the CGH radius normal is once introduced into the radius test bench intrafocally, and once extrafocally in autocollimation. In both cases, it is adjusted along the z-axis such that as little defocusing as possible occurs in the interferogram. The displacement path between the two positions is measured and supplies $R_{PATTERN}$ $$R_{PATTERN} = \frac{\text{displacement path intrafocal} - \text{extrafocal}}{2}$$

As mentioned above, because of polishing errors, the CGH substrate can exhibit a residual curvature, that is to say have a radius of curvature $R_{SUBSTRATE}$. This affects adversely the radius $R_{NORMAL}$ of the simulated spherical mirror. However, $R_{SUBSTRATE}$ can be measured with the aid of known methods, for example, also via an interferometric measurement of the surface defocus Z4 (Zernike coefficient of the defocus) in order to increase the measuring accuracy. $R_{SUBSTRATE}$ can easily be calculated from Z4 (see FIG. 3).

In a third step, the values of $R_{PATTERN}$ and $R_{SUBSTRATE}$ thus determined are used to calculate the currently effective radii $$R_{NORMAL}^{intra} \quad \text{and} \quad R_{NORMAL}^{extra}$$

of the CGH radius normal in intra- and extrafocal positions (see FIG. 4). During the calibration of the radius test bench outlined at the beginning, these values are used instead of the desired radius. As a result the measuring accuracy is improved.

By means of this method, the two currently effective radii are attributed to absolutely measurable variables such as displacement path and substrate defocus. The CGH radius normal is therefore now a CGH radius absolute normal.

The measurement of the displacement paths can be undertaken in different ways, for example with the aid of a laser wavelength interferometer. In this case, the atmospheric temperature, pressure and humidity should also be measured when measuring the displacement path, in order by taking them into account, to increase the measuring accuracy.

It is also possible for any CGH writing errors that lead to deviations of the simulated spherical mirror radius from the desired value to be established by measuring the displacement path between intra- and extrafocal autocollimation positions, and to be taken into account during the subsequent calibration of the radius test bench.

What is claimed is:

1. A method of calibrating
   comprising the steps of establishing a radius test bench with a cat's eye position and at least one autocollimation position;
   entering a computer generated hologram radius normal having an exact radius into at least two of said positions;
   determining a measured radius from a distance between the positions,
   comparing said measured radius with said exact radius.

2. A method of measuring a radius
   comprising the steps of establishing a radius test bench with a cat's eye position at least one autocollimation position;
   entering a lens or mirror into at least two said positions,
   determining a primary radius from a distance between these positions,
   correcting said radius using the method of calibrating of claim 1.

3. A method for calibrating a radius test bench for measuring radii of optical elements utilizing a interferometer, said interferometer having an illuminating system that generates a spherical wave, and having a diffractive optical element that retroflects a spherical wave of a specific radius into said test bench, comprising the steps of introducing said diffractive optical element into the radius test bench in at least two positions, a first position thereof being a cat's eye position and another position being an autocollimation position, detecting deviations of said radius test bench from the radius of curvature as errors of said radius test bench by using a radius of curvature simulated by said diffractive optical element and taking said errors into account in the measurements of optical elements to be tested.

4. The method as claimed in claim 3, wherein said optical elements to be tested are selected from the group consisting of spherical or aspherical lenses and spherical or aspherical mirrors.

5. The method as claimed in claim 4, wherein said illuminating system comprises a laser as light source and an interferometer, and further including the step of determining said errors of said radius test bench in said interferometer by the comparison of the spherical wave emitted from the illuminating system with the retroreflected spherical wave.

6. The method as claimed in claim 3, further including the step of bringing said diffractive optical element into the intrafocal and into the extrafocal autocollimation position in addition to the position in the cat's eye position.

7. The method as claimed in claim 3, including the step of fabricating said diffractive optical element as a computer-generated hologram (CGH) that is written on an x-y plotter.

8. The method as claimed in claim 7, including the step of fabricating said computer-plotted hologram as a chromium mask on a wafer.

9. The method of claimed in claim 8, including the step of connecting said wafer to a carrier.

10. The method as claimed in claim 7, including the step of establishing any CGH plotting errors that lead to deviations of the simulated spherical mirror radius from the desired value by measuring the displacement path between intrafocal and extrafocal autocorrelation positions, and taking said errors into account in the subsequent calibration of the radius test bench.

11. The method as claimed in claim 10, including the step of measuring displacement paths with the aid of a laser wavelength interferometer.

12. The method as claimed in claim 11, including the step of measuring at least one of environmental quantities, selected from the group consisting of atmospheric temperature, pressure and humidity during said displacement path measurement in order to improve the measuring accuracy.

13. The method as claimed in claim 3, including the step of measuring a CGH substrate radius separately and taking the radius into account when the currently effective radii of the simulated spherical mirror.

* * * * *

UNITED STATES PATENT AND TRADEMARK OFFICE
CERTIFICATE OF CORRECTION

PATENT NO. : 7,154,612 B2 Page 1 of 1
APPLICATION NO. : 10/420573
DATED : December 26, 2006
INVENTOR(S) : Rolf Freimann It is certified that error appears in the above-identified patent and that said Letters Patent is hereby corrected as shown below:

Column 4, line 25
Please delete "...µm This corresponds ..." and insert --... µm. This corresponds ...--

Column 6, line 24
Please delete "... method of claimed ..." and insert --... method as claimed ...--

Column 6, line 44
Please delete "... when the currently effective..." and insert --... when determining the currently effective ...--

Signed and Sealed this

Twentieth Day of November, 2007

JON W. DUDAS
*Director of the United States Patent and Trademark Office*